Figure 6:
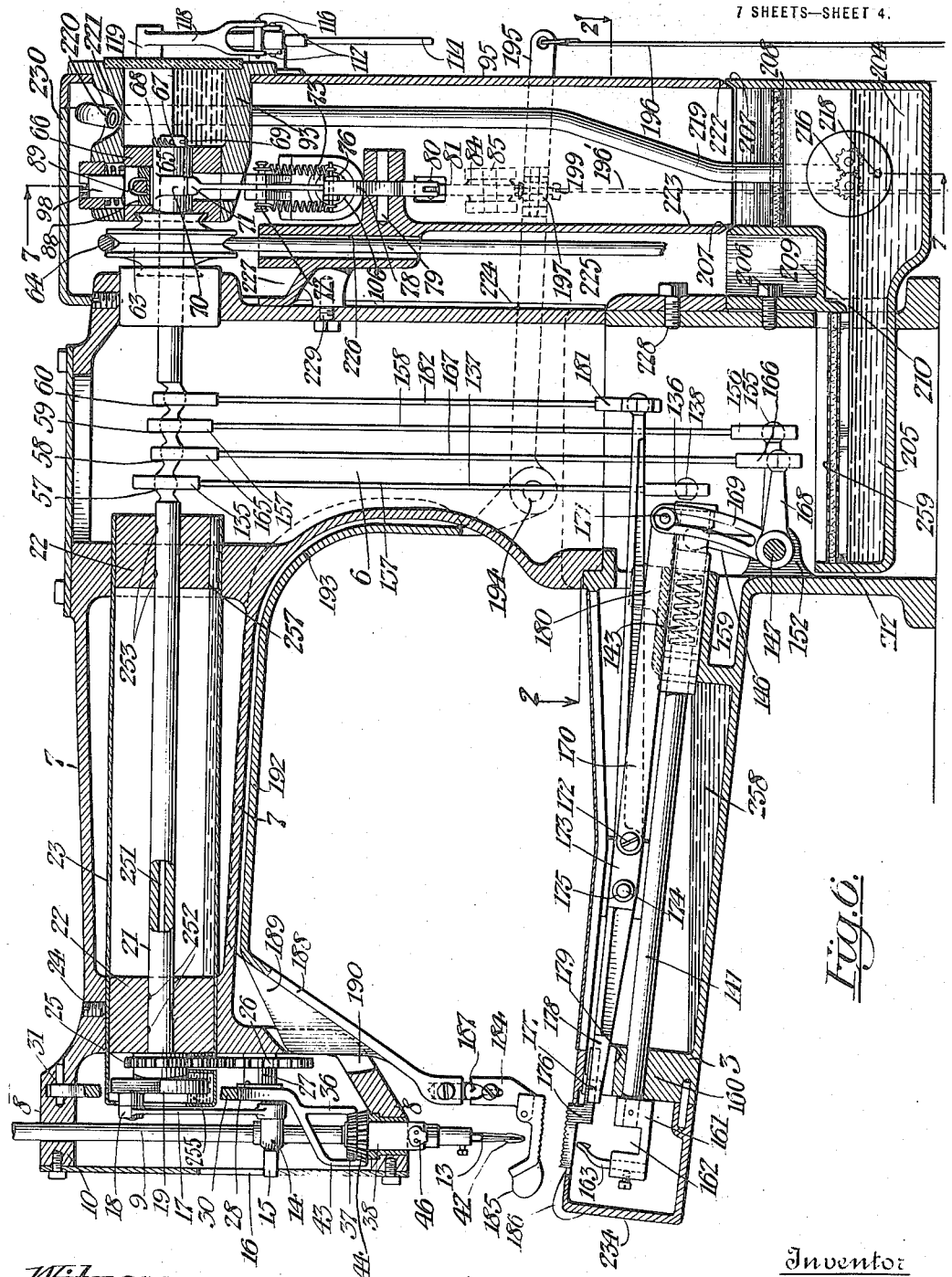

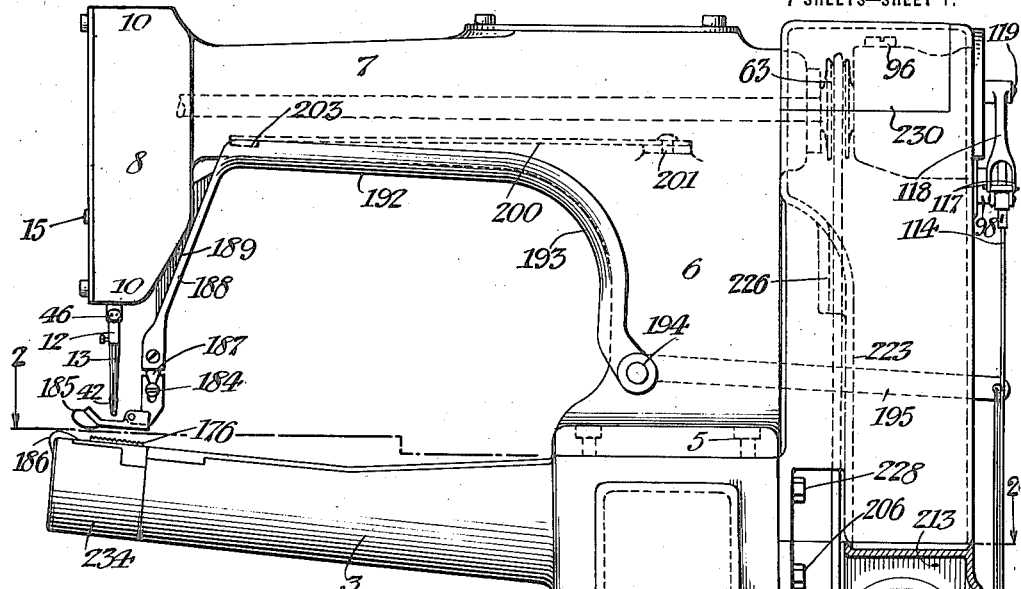
Fig. 1.
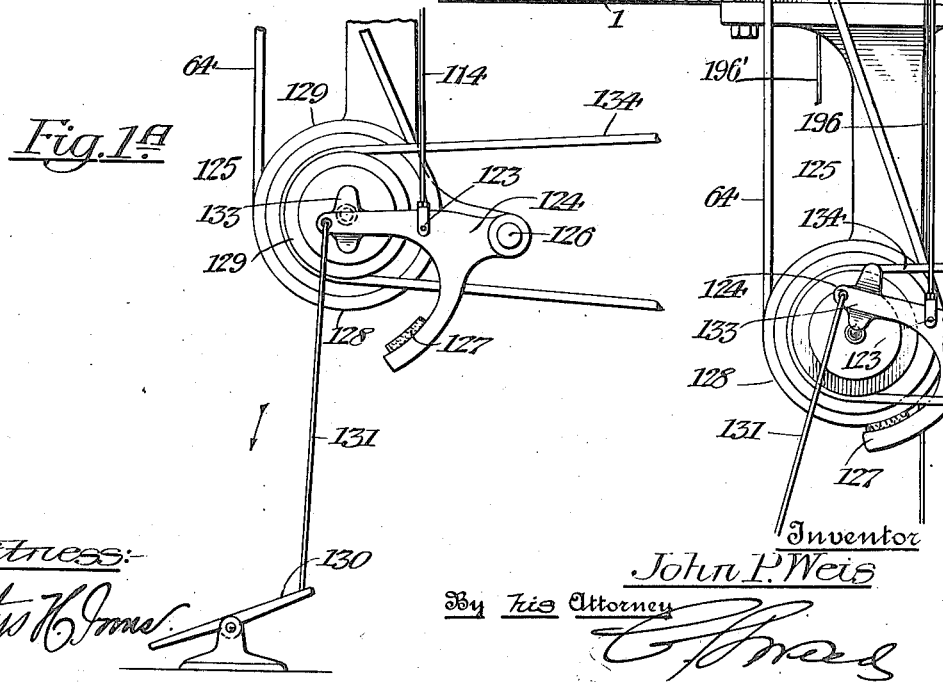
Fig. 1ª.

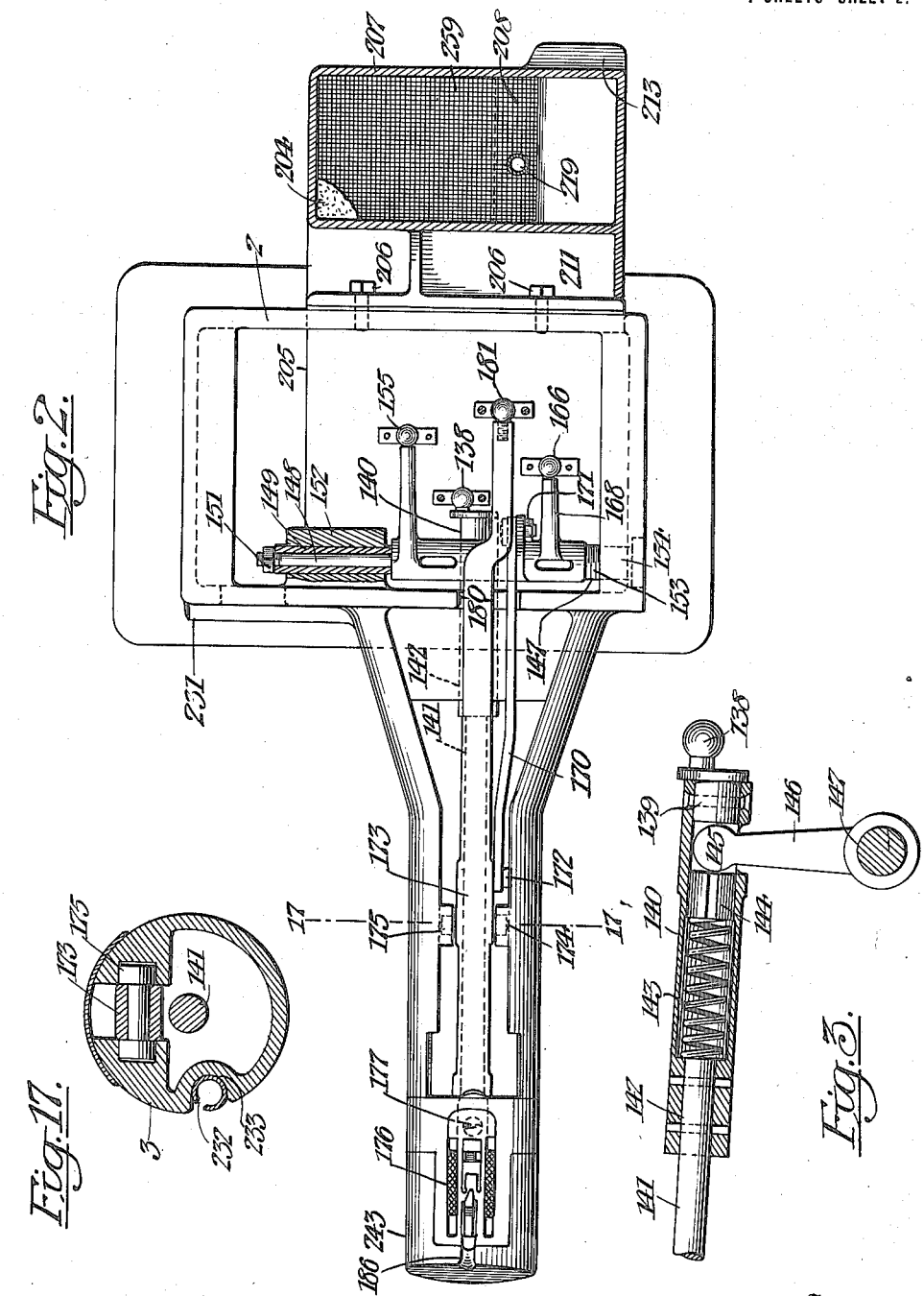

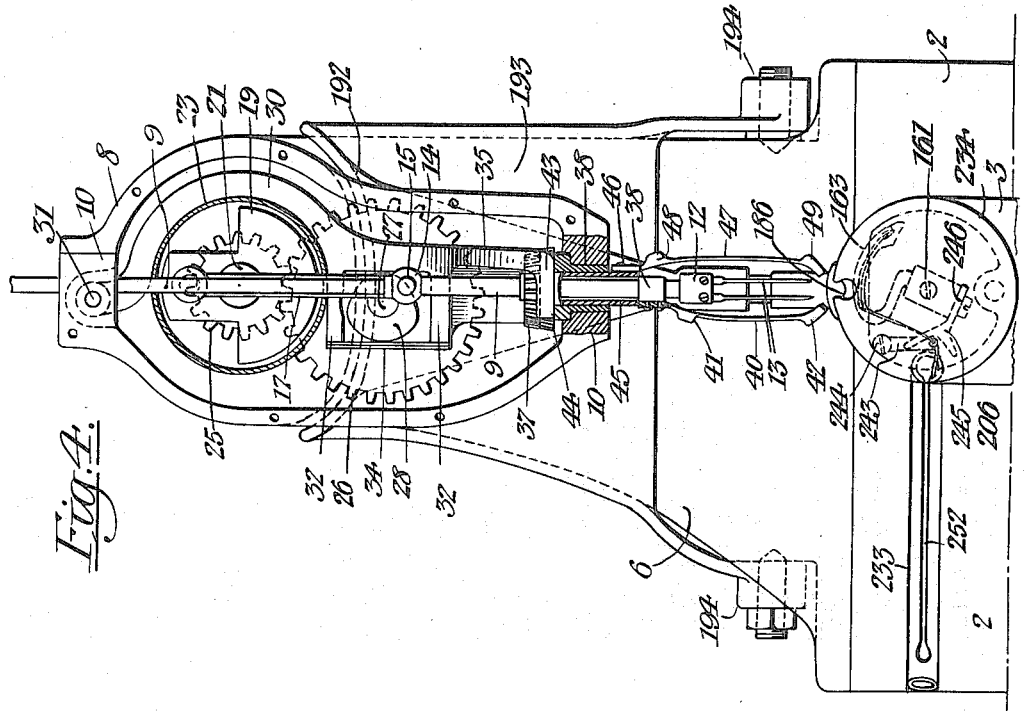
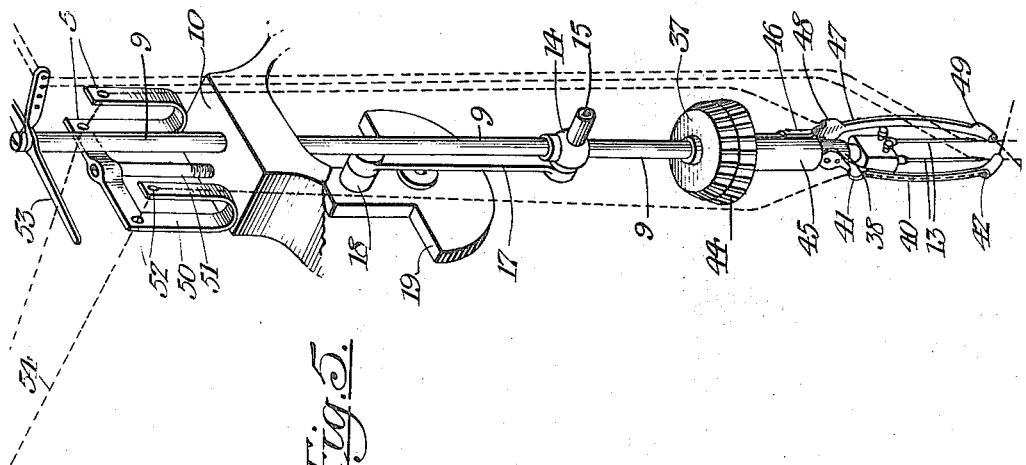

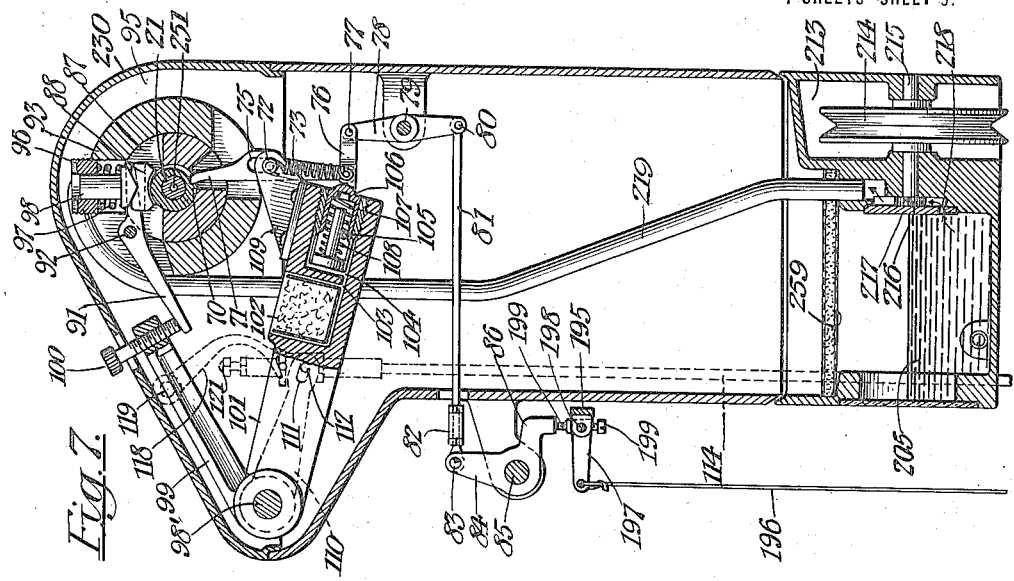
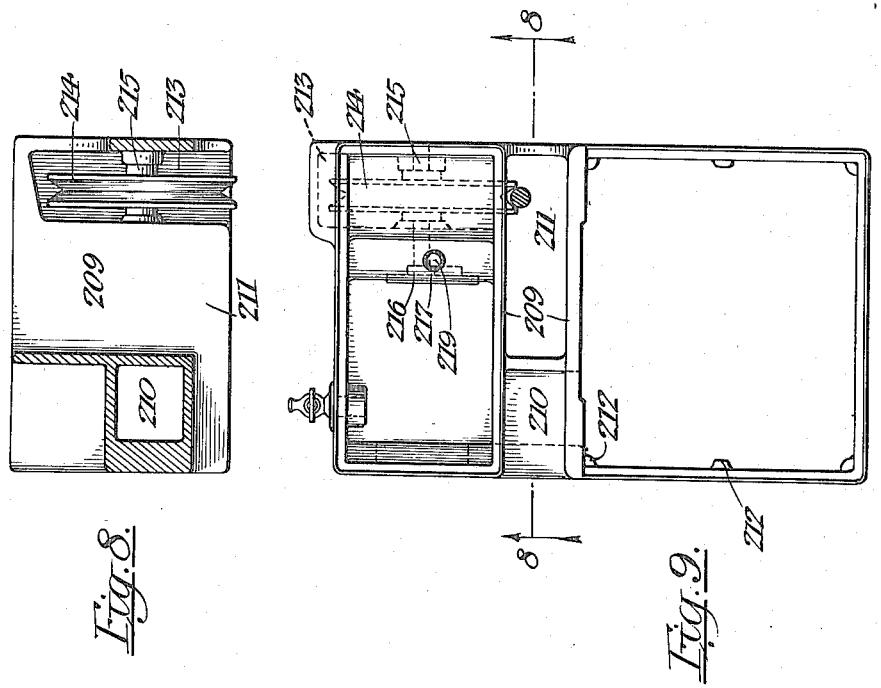

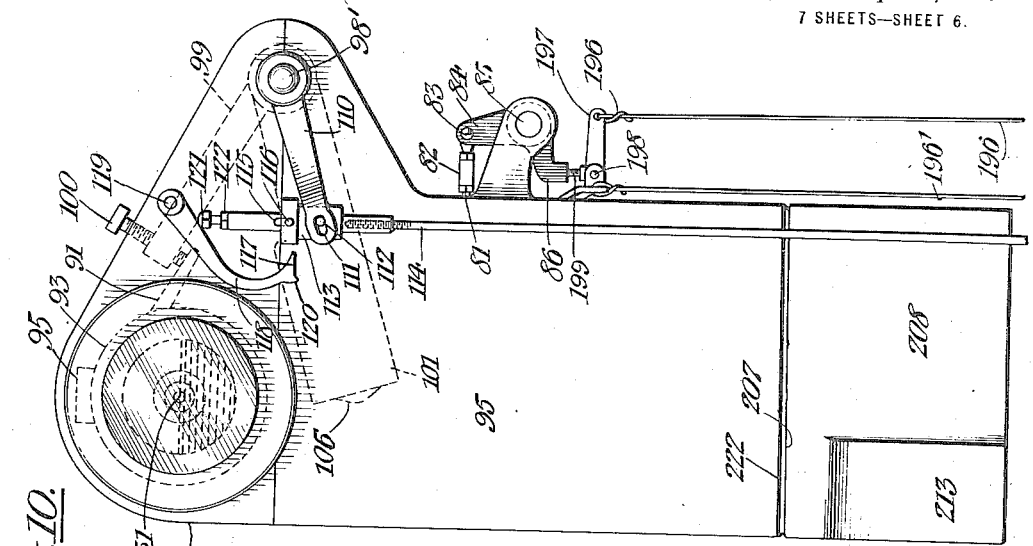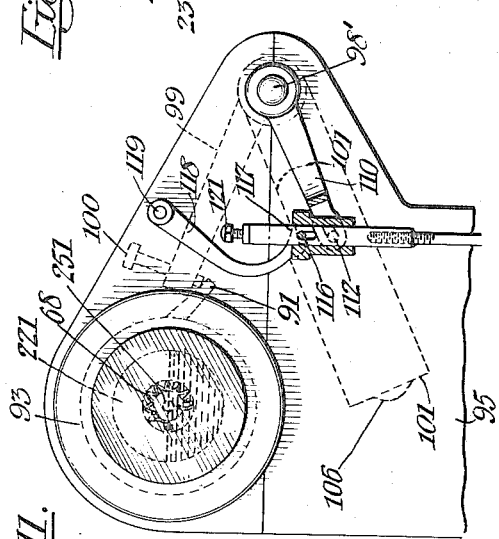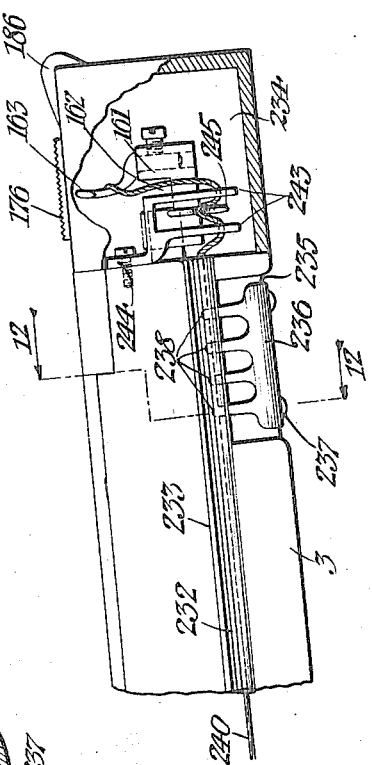

J. P. WEIS.
SEWING MACHINE.
APPLICATION FILED DEC. 2, 1915.
1,221,254.
Patented Apr. 3, 1917.
7 SHEETS—SHEET 7.
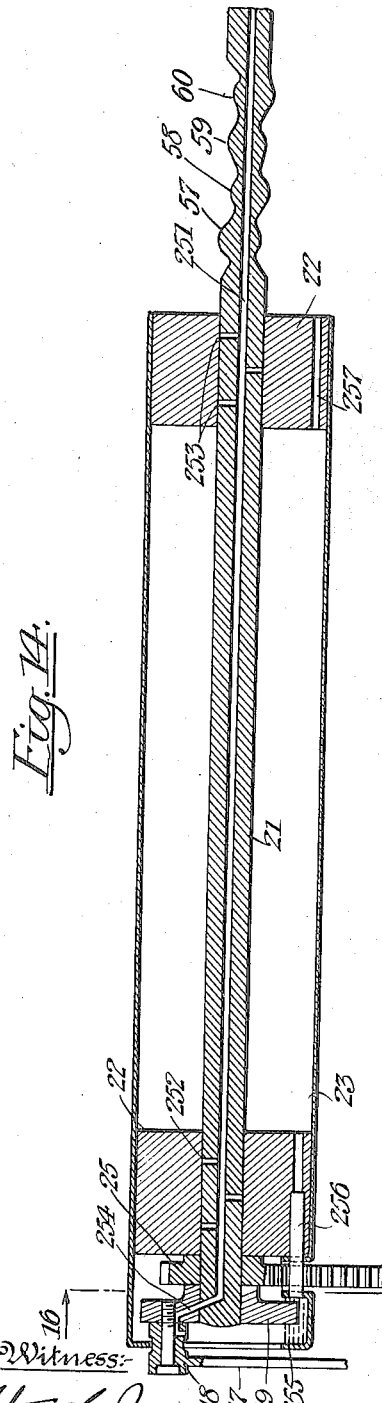
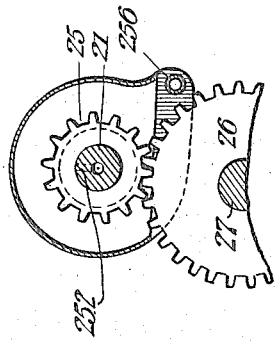
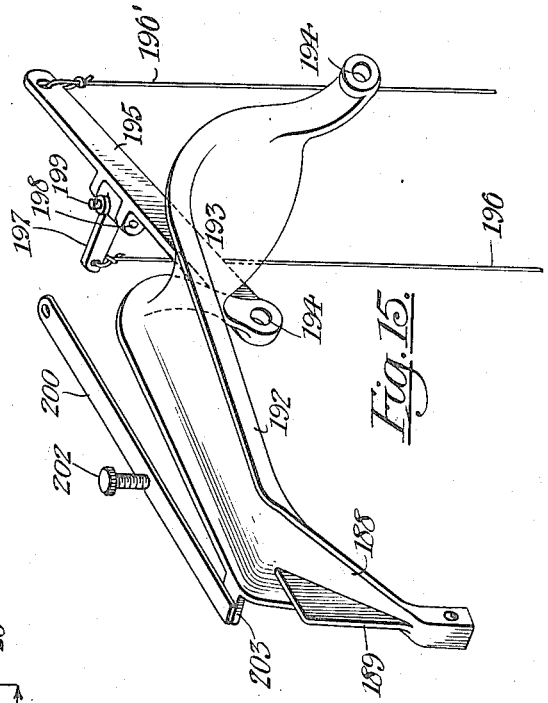
Inventor
John P. Weis
By his Attorney

UNITED STATES PATENT OFFICE.

JOHN P. WEIS, OF NYACK, NEW YORK, ASSIGNOR TO LUCIUS N. LITTAUER, OF GLOVERSVILLE, NEW YORK.

SEWING-MACHINE.

1,221,254.         Specification of Letters Patent.         Patented Apr. 3, 1917.

Application filed December 2, 1915. Serial No. 64,630.

*To all whom it may concern:*

Be it known that I, JOHN P. WEIS, a citizen of the United States, residing at Nyack, in the county of Rockland and State of New York, have invented certain new and useful Improvements in Sewing-Machines, of which the following is a specification.

This invention relates to sewing machines of that style having a cylindrical bed or horn, wherein the feeding and a part of the stitching mechanisms operate for the purpose of operating on or forming tubular goods, the object of the invention being to provide an improved machine which can be operated at very high speed, stopped and started instantly or as rapidly or slowly as desired without undue noise or shock, and which machine is largely automatically operated and also automatically lubricated, and in which the presser foot is also automatically operated so that the operator need only guide the work and manipulate the treadle to control the machine, thereby avoiding the necessity of the operator consuming a large part of his time, as heretofore, in turning the machine each time it is stopped by hand to put the needles in the highest position and raise the presser foot so that the work may be positioned.

A further object of the invention is the provision of a machine in which the threading of the looper mechanism may be accomplished from the outside of the horn or cylinder, thus obviating the necessity of removing any cover plates other than the end cap, and in which machine the winding of the thread around the looper shaft or bracket is also prevented, which advantages, together with others which will appear hereinafter, including an improved manually operated speed control highly essential in this type of machine, result in the provision of an improved machine of the type described.

It will be understood, of course, that various stitching mechanisms may be employed to make any of the well known stitches, and that the various details may be more or less changed without departing from the spirit or scope of this invention.

In the drawings accompanying and forming part of this specification, Figure 1 is a side elevation, partly in section, of this improved sewing machine and illustrates the manner in which the machine is belted up for operation with this improved power-transmitting or speed controlling means; Fig 1^A is a detail of the power transmitting means; Fig. 2 is a top view partly in section of the bottom portion of the machine; Fig. 3 is a sectional detail view of the looper shaft; Fig. 4 is an end, partly sectional, view of the machine shown in Fig. 1 and particularly illustrates the mechanism for forming the stitches on top of the work; Fig. 5 is a detail perspective view showing the needle-driving means, the cross-stitch fingers for forming the stitches on top of the work and certain of the actuating parts; Fig. 6 is a sectional view of Fig. 1; Fig. 7 is a sectional view taken on the line 7—7 Fig. 6, and looking in the direction of the arrow and shows the stopping and starting mechanism and the means for automatically raising the presser foot, and also certain parts of the lubricating system; Fig. 8 is a sectional view of the pump wheel casing taken on the line 8—8 of Fig. 9 and looking in the direction of the arrow; Fig. 9 is a top view of the pump casing and oil tank; Fig. 10 is an end view showing the speed-controlling mechanism for starting and stopping the machine; Fig. 11 is a view similar to Fig. 10, showing the same parts in a different position; Fig. 12 is a cross section of the cylindrical bed or horn taken on the line 12—12 of Fig. 13, and shows the thread-handling and tension means therefor; Fig. 13 is a side elevation of the free-end portion of the cylindrical bed, showing the thread-guiding tube and the thread-tension means and its end cap; Fig. 14 is a sectional detail view showing the top shaft and the method of lubricating the parts thereof; Fig. 15 is a detail perspective view of the presser foot mechanism; Fig. 16 is a detail view showing the gears for actuating the cross-thread fingers for making the stitches on top of the work and also illustrates the manner in which the lubricant is conducted from the needle-actuating crank back into the machine; and Fig. 17 is a cross section on the line 17—17, Fig. 2.

Similar characters of reference indicate corresponding parts in the different figures of the drawings.

In the drawings the machine is shown mounted on a suitable work bench or table, and comprises a base portion 2 provided with a cylinder bed or horn 3 and a top arm 7 the bottom portion of which is secured to the base 2 by screws 5. This cylindrical bed or horn is tipped upward toward the free end at an angle to the top shaft, and thus prevents the lubricant from leaking therefrom and also enables the various moving parts to be lubricated by gravity while facilitating a more perfect entrance for the goods into the seam guide 186 and keel 185. It is customary in operating machines of this type to hold the work slightly downward from the free end in order to control the same. The tipping of the cylinder bed overcomes this necessity and further facilitates, as stated, the feeding of the work on to the same.

The hollow top arm 7 comprises a vertical hollow portion 6 at one end and a head 8 at its opposite end wherein the needle bar 9 reciprocates in suitable bearings 10 and is provided with a needle chuck 12 carrying needles 13. A needle-bar clamp collar 14 is secured to the needle bar and is provided with a stem 15, and this stem reciprocates in a guide slot 16 in the head 8 to steady the needles and needle bar in their movements and prevent any axial movement. A link 17 connects the stem 15 at one end and a crank pin 18 at the other end, which crank pin is secured to a crank disk 19 secured to the top shaft 21, which rotates freely in bearings 22 carried by a tubular casing 23 rigidly secured in the top arm 7. Secured to and forming part of the crank 19 is a gear 25 meshing with a gear 26 which constitutes a two-to-one drive, that is the gear 25 will make two revolutions to each single revolution of the gear 26. The gear 26 freely rotates on a stud 27 secured in the head 8. A cam 28 carried by the stud 27 to rotate with the gear 26 coöperates with a yoke 30, (see Fig. 4), which is pivoted at 31 in the head 8 to swing freely as the cam 28 rotates. The yoke 30 is provided with a pair of arms 32 having secured thereto flexible strips 34 to co-act with the cam 28. These flexible strips compensate for any irregularities that may be in the cam and afford a means of taking up wear and preventing noise. The yoke 30 has an angular depending web portion 35, (see Figs. 4 and 6), one part, 36, of which is provided with circular conical rack teeth that co-act with a gear 37, which is part of a tubular bearing 38 having secured at its lower end, a thread-carrying finger 40 having a thread-guiding hole 41 and a tubular thread-guiding end 42. The other part 43 of the yoke 30 is also provided with similar gear teeth that co-act with a gear 44, which is part of a tube 45 having also, at 46, a thread-carrying finger 47 having a thread hole 48 and a tubular end 49. Located in the head 8, just back of the needle bar, are U-shaped thread guides 50, (see Fig. 5), supported by a post 51, which guides have holes 52 to guide the threads. The needle bar 9 carries a cross extension piece 53 to co-act with the U-shaped portions of the thread guides to draw the threads from the supply as the needle bar descends, giving sufficient thread to the fingers 40 and 47 for the formation of the cross stitches.

From the foregoing it will be seen that as the cam 28 is rotated the yoke 30 is swung on its pivot to impart motion to the gears 37 and 44 and so give rotary oscillating movement to the thread-carrying fingers 40 and 47 around the needles from a position in the rear thereof, passing one another on a center line in front of the needles, alternating in this manner as each stitch is made by the needles. The top shaft 21 is provided with ball cranks 57, 58, 59 and 60, the rear end of this shaft 21 being supported in a suitable bearing. A loosely mounted belt-driven clutch wheel 63 operates adjacent to this bearing and is driven by a belt 64. A bushing 65 in the form of a driven clutch member is carried by the end of the shaft 21 and has a portion thereof operating within the clutch wheel 63 forming the other member of the clutch and a portion projecting into a bearing 66, and this bushing has a pin 67 on the end thereof. A spring 68 connects therewith at one end and has its other end connected with the top shaft 21, as at 69. This clutch 63 and 65, may be any ordinary form of clutch, such, for instance as, the coaster-brake clutch used on bicycles, in which the bushing has openings for the reception of three balls, and wedges for pushing the balls in engagement with the belt pulley wheel, but as there are no claims *per se* to this clutch, it is not deemed necessary to further describe the same. The bushing 65 is eccentrically cut out to form a stop tooth 70, (see Fig. 7), which co-acts with a stop finger 71 pivotally secured at its lower end to a link 76. This stop finger 71 is provided with a slot 75 through which a pin 72 extends, and which pin is carried by the part 109. Pull springs 73, (see Figs. 6 and 7), connect this pin 72 with a pin carried by the link 76 and thus hold the bottom of the slot 75 of the top finger against its pin 72. The link 76 has its outer end pivoted to a lever 78, (see Fig. 7), which is pivotally secured to the casing, as at 79, and has its other end connected to a rod 81 having an adjusting means 82 for regulating its length, and this rod is pivoted to a bell-crank lever 84 pivoted to the casing. This lever has a depending end 86 to co-act with the presser-foot lifting mechanism to be described hereinafter. The bearing 66 is also cut out, as at 87, to receive a brake shoe 88. The brake shoe is slotted, as at 89, to receive the end of a lever 91, which is pivoted at 92 to the bearing 93 secured to the casing 95. This bearing 93 is tapped out to receive a suitable hollow screw 96 under which a spring 97 is located, with its lower end resting on a plug 98 to give downward pressure to the brake shoe. This pressure plug 98 is also slotted to receive the end of the lever 91. Pivoted to the casing 95 at 98′ is a two-armed lever one arm 99 being tapped to receive an adjusting screw 100, one end of which engages the end of the lever 91. The other arm 101 of the lever has an oil receptacle at 102 carrying filtering material and a channel 103 leading into a chamber 104 to feed oil to the stop check or buffer 105, which comprises a sliding sleeve 106 operating in a bushing 107, and a spring 108 to return the sleeve 106 to its initial position. As the lubricating mechanism just described will form the subject-matter of a separate application further detailed description is deemed unnecessary.

Carried by the lever arm 101 is the part or bracket 109 hereinbefore referred to which supports the pin or pivot 72. Secured to the pintle of the arms 99 and 101 outside of the casing 95 is an arm 110, (see Figs. 7, 10 and 11), provided with a slot 111 for the reception of a pin 112 carried by a sleeve 113 free to slide on a rod 114 and guide the latter by reason of a slot 115 therein through which a pin 116 carried by said sleeve extends. This pin 116 projects beyond the sleeve and co-acts with a tooth 117 carried by a latch 118 which is pivoted at 119 to the casing 95. This latch is also provided with a depending part 120 to limit its engagement with the pin 116. A screw 121 is tapped into the end of the rod 114 and provided with a lock nut 122 to secure its adjustment. This screw 121 co-acts with the latch 118 to lift it out of engagement with the pin 116. The latch, if preferred, may be forked so as to engage the pin on both sides of the collar or sleeve 113. The rod 114 extends down through the table 1 and connects, as at 123, with a starting lever 124, (see Figs. 1 and 1ᴬ), of the transmitter 125, which lever is pivoted on a shaft 126 having a brake arm 127 to act against the rim 128 of the belt wheel 129 to stop the same. Any of the well known transmitters may be used. A floor treadle 130 connects with the rod 131, which is connected to the starting lever 124. Means for starting the sewing machine drive wheel is indicated by 133. The usual belt 134 from the power driven shaft, (not shown), is provided.

Suitable looper mechanism is provided, and this is connected with the top shaft 21 by a ball joint 135 and rod 137, which in turn is connected by a ball joint 136 with a ball crank 138, (see Figs. 3 and 6), which is secured at 139 in the tubular end 140 of the looper shaft 141. This tubular end is secured to the looper shaft 141, as at 142, and is provided with a spring 143 therein to give pressure to the sliding plug 144 which forms one bearing against the ball end 145 of the looper crank 146, while the stud of the ball crank 138 forms the other wall for the circular end 145 of the looper crank. The looper crank is pivotally supported on a shaft 147, (see Figs. 2 and 3), which is reduced at one end, as at 148, to receive a bushing 149 and is threaded, to receive a nut 151. The bushing 149 is supported in a bearing 152 of the machine base 2. The opposite end of this shaft 147 has an enlarged threaded portion 153 tapped into the wall 154 of the machine base 2. The other arm of the looper crank 146 also has a ball 155 working in a ball socket 156 connected by a rod 158 with a ball socket 157, which is actuated by the bell crank 59 of the top shaft to shift the looper shaft 141 in the direction of its length, while the bell crank 57 and its connecting rod rocks the looper shaft in its bearings 159 and 160. The forward end of the looper shaft has adjustably secured thereto a looper holder 161 cut out at 162 to clear the needles on their downward movement and which adjustably supports a looper 163.

Suitable feeding mechanism is also provided, and this is also connected with the top shaft 21 by a ball socket 165 carried by a rod 167 the lower end of which is connected by a ball socket 166 with a rock arm 168 mounted on the shaft 147. This rock arm 168 is shown integral with a slotted arm 169, (see Fig. 6), which has adjustably connected therewith a link 170. The connecting bolt 171 which passes through the slot of this arm 169 affords a means of adjusting the throw or movement of the link 170. This link 170 is pivoted, as at 172, to a feed bar 173, and this feed bar carries a stud 174 on which are rollers 175, (see Figs. 2 and 17). A feed dog 176 is adjustably secured to the feed bar, as at 177. The free end 178 of the feed bar is guided in a slot 179 formed in the cylinder or horn 3, while the rollers 175 of the feed bar are also guided in recesses of the horn, (see Fig. 17). The feed bar 173 is also guided, as at 180, above the looper shaft bearing 159 to prevent any lateral vibration or twisting of the feed bar in its rocking reciprocating motions. This feed bar is rocked on its stud or pivot 174 by means of its ball joint connection 181, rod 182, and ball joint connection with the ball crank 60.

From the foregoing it will be seen that both the looper and the feed dogs derive all of their movements from the top shaft.

The presser foot mechanism comprises the usual presser foot 184 provided with a seam-guiding keel 185 co-acting with a pair of ribs 186 forming therebetween a guiding groove in the end of the horn 3, (see Figs. 2 and 6). This presser foot 184 is secured to a bar 187 which extends upward and backward, being slightly curved, as at 188, and carries a guiding fin or web 189, (see Figs. 6 and 15), operating in a slot 190 located in the machine head 8 to give it lateral rigidity. The top wall 192 of this bar is concaved to conform to the shape of the top arm 7 of the machine and is also shaped to fit the arm, as at 193. It is provided with two bearings 194, by which it is pivotally secured to the vertical portion 6 of the top arm, and it has an extending lever 195 the end of which is connected with a rod or chain 196′, (see Figs. 6 and 15), by which it may be manipulated in case of emergency by means of a floor treadle or otherwise. A swinging lever 197 is pivotally secured, as at 198, to the lever 195, (see Figs. 6, 7 and 15), and has an adjustable screw 199 in position to abut against the end 86 of the lever 84 hereinbefore referred to, (see Fig. 7). By manipulating a rod 196 connected to this lever 197 and to a suitable treadle the screw 199 is turned out of engagement with the end 86 of the lever 84, and enables the presser foot to return to its lowest position by the action of its spring. A presser foot spring 200 is secured to the rear of the machine, as at 201, and has an adjusting screw 202 for regulating the tension thereof. A lug 203 at the end of the spring acts to depress the foot. The automatic action of the presser foot will be described in connection with the operation of the machine.

It will, of course, be understood that while the automatic lifting of the presser foot is shown in connection with this improved form of presser foot bracket, it is not confined to such construction, as the raising of the presser foot simultaneously with the stopping of the machine may be accomplished with any of the well known presser foot mechanisms now in use. I prefer, however, to use the construction as shown, for the reason that the supporting means or bearings 194 are located approximately on a line with the presser foot bottom so that the action of the feed is directly in line therewith. It has been demonstrated that a presser foot mechanism so arranged and supported will operate at the highest speed and follow the action of the feed as desired with very little spring tension to hold it down on the work. Obviously much load is taken from the feeding mechanism and more delicate fabrics can be stitched without cutting or rupturing the same as it passes between the feed and foot. Another advantage is that the multiple lifting means is in the rear of the machine out of the way and obviates the necessity of the usual presser foot lifting hand lever and the auxiliary lever usually operated from a floor treadle by means of a chain or a system of levers well known in the art.

The lubricating mechanism comprises an oil tank 204 located in the machine base and having an extending portion 205, (see Figs. 2 and 6), located directly underneath the operating mechanism. The tank is secured to a rear wall of the base 2 by suitable screws 206. The top of the tank is provided with beveled edges 207, and it also has filtering means 208 therein. The portions 204 and 205 of the tank are separated by the walls 209, (see Fig. 9), but have a connecting passage through said walls, as at 210. The space 211 between the walls 209 is for free passage of the driving belt 64, (see Fig. 6). The lugs 212 serve as a rest for the filtering means, while the cut out portion 213 forms a housing for the pump wheel 214, which is secured to the shaft 215 operating in the walls of the tank portion 204. A geared pump, (see Figs. 2, 7 and 9), represented by the gears 216, operates in a recess covered by a plate 217 provided with an oil-inlet hole 218 and a conducting pipe 219 for carrying the lubricant up to and discharging it at 220 into the end bearing, as at 221. The casing wall 95 extends downward and is beveled, as at 222, to fit into the upper beveled portion 207 of the tank 204 to properly shed the lubricant. An intermediate wall 223 and a wall 224, (see Fig. 6) afford an inclosure for the driving belt 64, and in order to prevent the lubricant from being tracked or carried by the driving belt the belt is protected by passing it from the transmitter 125 up through the table to the pump wheel 214 through the space 211 and between the walls 223 and 224, forming the space 225 and opening 226 formed in the casing, which is so shaped, as at 227, to prevent the lubricant from escaping through the belt passage. This part of the casing or housing is secured to the base at 228 and to the vertical portion 6 at 229, and a loose or detachable cover 230 is provided to cover up the top portion thereof, (see Figs. 6 and 7). In operation a part of the lubricant escapes through the end bearing oil chamber 221 into the receptacle 102 hereinbefore described to keep the stop or buffer supplied with lubricant. It will be observed from the drawings that the entire stop mechanism and the greater part of the lubricating mechanism is contained in a separate casing detachably secured to the sewing machine frame so that it may be quickly removed for repairs or other purposes, and this facilitates the practicability of attaching the improvement to any sewing machine, the entire mechanisms being incased so that there is no escape of lubricant. The belt is also incased to overcome the possibility of goods catching, as is frequently the case with ordinary machines, and obviates the necessity of all the usual detachable or auxiliary guards for the belts and belt wheel.

The thread-controlling mechanism comprises a tube 231, (see Fig. 17), and this tube is seated in the horn, as at 233, so as to be substantially flush with the diameter thereof and is provided with a slot 232 throughout the length of the horn, and thus affords means of conducting the looper thread from the source of supply to the looper, and this obviates the necessity of removing any parts of the machine in the threading of the loopers except the end cap 234, which is secured in some suitable manner to the horn. This tube at its inner end is bent to conform to the base, (see Fig. 2), and guides the thread from the source of supply. Near the free end of the horn a depression 235 is provided to receive a tension spring 236, it being secured as at 237, and this spring is provided with fingers 238 extending up into slots 239 of the tube 231. When the thread 240 is first drawn into the tube the tension spring 236 is pressed inward in the direction of the arrow, (see Fig. 12), so as to bring the thread between it and the wall of the tube, so that upon releasing the tension spring the thread is gripped between the fingers 238 and the wall of the tube, as at 241, (Fig. 12). The pressure of the spring may be regulated by a screw 242. The looper thread 240 passes to the forked eyelet guide 243, (see Figs. 4 and 13), adjustably secured, as at 244, to the horn near its free end, and operating between this forked thread guide 243 is a takeup arm 245 adjustably secured, as at 246, to the looper carrier 161. As the looper is entering the needle loops the end of this takeup arm co-acts with the thread to take up the slack between the eyes of the looper and the end of the thread extending to a previous stitch. As the looper starts backward the end of the takeup will co-act with the thread between the guides 243 to take up the slack thread. Adjustment of these parts is so arranged as to suit the character of stitch being made. One of the main advantages of having the thread controlling parts located at the free end of the horn is to overcome the necessity of re-threading parts at the rear of the machine, which is usual in all machines heretofore used, for when the thread breaks its tendency is to wind around the moving parts of the machine, such as the takeups, etc., and when these are located in the rear the thread is drawn from the end of the looper as it breaks close thereto into and around the moving parts at the rear of the machine. Despite the various devices that have been devised to overcome this tendency it is still a source of great annoyance and loss of time. The thread must be again inserted through the various parts at the rear of the machine, then drawn through such guides as are provided by a hook or wire leader, the cover removed from the bed of the machine, and the various eyelets located therein for leading and guiding the thread, etc. This is all obviated in the present improvement, because the thread tension and takeup mechanism is located at the free end of the cylinder, so that when the thread breaks it is merely necessary to re-thread the looper, as in most cases the thread will be retained by the takeup fork and thread tension, and thus a great saving of time is effected. Another advantage is in the facility of adjustment of these parts on account of their location. The axial adjustment of the looper is also facilitated by reason of its location at the free end of the cylinder, as frequently when the looper is timed too fast or too slow the thread-handling parts are usually timed to correspond with such movement.

In the operation of the machine, the treadle 130 is actuated to pull down the rod 131 and thereby the starting lever 124 in the direction of the arrow, Fig. 1ᴬ, and thus permit power to be transmitted from the belt 134 to the sewing machine belt 64. At the same time the brake 127 is released from the rim 128 and the belt 64 permitted to operate. This movement of the starting lever 124 pulls down on the rod 114 connected thereto and to the lever 110, and the latter is also moved downward until the pin 116 engages the top of the slot 115 in said rod 114, at which time the sleeve 113 is brought down to a position where the tooth 117 is caused to swing by gravity over such pin 116 and so hold the sleeve 113 in the position shown in Fig. 11. This movement of the lever 110 also rocks the shaft 98 so as to shift the lever 101 to disengage the stop finger 71 from the tooth 70 of the clutch sleeve member 65, (see Fig. 7), at which time the spring 68 connected to this clutch member 65 and the shaft causes the engagement of the clutch member 65 with the clutch wheel 63, thus giving rotary motion to the top shaft 21, the brake shoe 88 having been released by the coöperation of the levers 99 and 91. As this movement takes place, the stop finger 71 is swung on its pivot 72 so that the link 76 will move away from the sleeve 106 and thus rock the lever 78 on its pivot 79, and thereby the lever 84 on its pivot 85 by means of the connecting rod 81, and thus shift the end 86 of the lever 84 out of engagement with the screw 199, thereby releasing the presser foot so that its spring will cause it to engage the work.

The machine being in motion of course turns the top shaft 21 and reciprocates the needle bar and actuates the top cross-thread fingers 40 and 47, while the looper 163 is directly actuated from the top shaft to co-act with the needles in the proper manner in the formation of the stitch and the feed dog given the usual four motions, also directly from the top shaft, through the mechanism previously described, so as to properly feed the work. The length of stitch or movement of the feed dog may be regulated by shifting the bolt 171 up or down in the slotted lever 169. While the sewing machine belt 64 is in motion, the lubricating mechanism is also in operation, forcing the lubricant up into the end bearing 221, where it serves to lubricate the clutch mechanism. A portion of the oil passes through the top driving shaft 21, (see Fig. 14), by means of an axial opening, and the top shaft is provided with outlets 252 and 253 for each of the top-shaft bearings and an outlet 254 to lubricate the crank 18. A portion of the oil is guided into the drip 255 and thence conducted by the tube 256 into the casing 23 located around the top shaft, and returns through the outlet 257, where it drops down, (see Fig. 6), and lubricates the mechanism carried by the transverse shaft 147 and also portions of the feeding mechanism. Lubricant also finds its way into the horn, as shown at 258, Fig. 6, to lubricate the bearing 159 and finally returning to the filter 259, thence to the tanks 205 and 204.

When it is desired to stop the machine, the adjustment of the stop motion mechanism with respect to the transmitter is such as to enable the rod 131 to shift the lever 124 to release the friction clutch of the transmitter and reduce the speed on the belt 64 to any extent, so as to suit the operation being performed, as it is essential in this type of machine when turning corners on seams or doing particular work to operate very cautiously and slowly along certain seams, while at other portions of the garment the highest speed may be maintained with ease and a rapid starting and stopping accomplished without damaging the work.

The starting and stopping mechanism is so organized, and its connection with the transmitter is such, that the speed of the machine may be varied in stopping and starting, and also its normal running speed varied irrespective of its starting and stopping speed, and all of which may be controlled at the will of the operator by the proper manipulation of the foot treadle. Viewing Figs. 10 and 11, it will be seen that as the rod 114 is moved upward at the time the transmitter is operated to slow down or stop, the latch 118 retains the pin of the sleeve 113 and so holds the levers 91 and 99 in the position shown in Fig. 11 until the rod 114 has moved upward sufficient to cause the screw 121 at the top thereof to engage the latch 118 and swing it on its pivot 119 to the position shown in Fig. 10. As the finger 117 slips from the pin 116, the lever 110, as well as the levers 99 and 101 are rocked so as to bring the stop finger 71 into engagement with the tooth 70 so as to release the clutch. Just a trifle in advance of this movement, however, the screw 100 permits the outer end of the lever 91 to move upward so that the spring 97 will force the plug 98 downward on to the brake shoe 88 and so grip the clutch sleeve 65, to release the clutch gripping action as the stop finger 71 engages the tooth 70 and stops further rotation of the clutch and top driving shaft. The rotation of the clutch member as it stops with the finger 71 in engagement therewith rocks the finger 71 on the pivot 72 and forces the sleeve 106 inwardly against the action of the oil contained therein, which acts as a check to absorb the shock and prevent rebound. At the same time the lever 78 is rocked so that the end 86 of the lever 84 contacts with the screw 199 of the presser-foot mechanism and lifts the foot. It will thus be seen that the blow of stopping the clutch is utilized to lift the presser foot through the mechanism described, and if it be desired to release the presser foot independently of stopping the machine the lever 197 may be manipulated manually for such purpose. By slipping the transmitter clutch, which of course is done by varying the pressure upon its treadle, it will be observed that by means of this mechanism the normal running speed of the machine may be varied; that is to say, by slipping this transmitting clutch the machine will be necessarily slowed down according to the amount of frictional engagement between the members of the transmitter clutch. And so in stopping and starting, the mechanism may be started gradually or fast, or may be stopped suddenly or slowly, by the manipulation of the treadle, according to the amount of slippage permitted of the transmitter clutch, by reason of the peculiar organization of the parts hereinbefore described. To illustrate, by the present improvement the machine may be started off with the top driving shaft making a speed of say 3000 revolutions per minute, or it may be started off with the top driving shaft making say 2000 or 1000 revolutions per minute, as desired, and likewise, it may be started slowly or gradually, as hereinbefore stated.

I claim as my invention:

1. In a sewing machine, the combination of a driving shaft, means for transmitting power thereto and including means for stopping and starting said shaft and comprising clutch mechanism including a driven clutch member connected with said shaft, a swinging stop coöperating with said driven clutch member to disengage the clutch mechanism and prevent further movement of the driven clutch member, and means for shifting said stop into and out of its operative position.

2. In a sewing machine, the combination of a driving shaft, means for transmitting power thereto and including means for stopping and starting said shaft and comprising clutch mechanism including a driven clutch member connected with said shaft, a swinging stop coöperating with a part of said clutch mechanism to disengage the same and prevent further movement of the driven clutch member, means for shifting said stop into and out of its operative position, and a buffer coöperating with said stop at a predetermined time.

3. In a sewing machine, the combination of a driving shaft, means for transmitting power thereto and including means for stopping and starting said shaft and comprising clutch mechanism connected with said shaft, means coöperating with a part of said clutch mechanism to disengage the same, means for shifting said last means into and out of its operative position, and means automatically operative to hold the disengaging means in a predetermined position and also automatically operative to release said disengaging means.

4. In a sewing machine, the combination of a driving shaft, means for transmitting power thereto and including means for stopping and starting said shaft and comprising clutch mechanism connected with said shaft, a swinging stop coöperating with a part of said clutch mechanism to disengage the same, means for shifting said stop into and out of its operative position, a presser foot, means connected with said swinging stop for automatically operating said presser foot and automatically operative means for holding said stop in a predetermined position.

5. In a sewing machine, the combination of a driving shaft, means for transmitting power thereto and including means for stopping and starting said shaft and comprising clutch mechanism connected with said shaft, a swinging stop coöperating with a part of said clutch mechanism to disengage the same, means for shifting said stop into and out of its operative position, a presser foot, means connected with said swinging stop for automatically operating said presser foot, and independent means for operating said presser foot.

6. In a sewing machine, the combination of a driving shaft, means for transmitting power thereto and including means for stopping and starting said shaft and comprising clutch mechanism connected with said shaft, a swinging stop coöperating with a part of said clutch mechanism to disengage the same, means for shifting said stop into and out of its operative position, a presser foot, means connected with said swinging stop for automatically raising said presser foot, and independent means for operating said presser foot.

7. In a sewing machine, the combination of a driving shaft, means for transmitting power thereto and including means for stopping and starting said shaft and comprising clutch mechanism including a driven clutch member connected with said shaft, a swinging stop coöperating with a part of said clutch mechanism to disengage the same and prevent further movement of the driven clutch member, means for shifting said stop into and out of its operative position, and a brake coöperating with a part of said clutch mechanism.

8. In a sewing machine, the combination of a driving shaft, means for transmitting power thereto and including means for stopping and starting said shaft and comprising clutch mechanism including a driven clutch member connected with said shaft, a swinging stop coöperating with a part of said clutch mechanism to disengage the same and prevent further movement of the driven clutch member, means for shifting said stop into and out of its operative position, and a brake coöperating with that part of the clutch mechanism with which said stop device coöperates.

9. In a sewing machine, the combination of a driving shaft, means for transmitting power thereto and including means for stopping and starting said shaft and comprising clutch mechanism connected with said shaft, a swinging stop coöperating with a part of said clutch mechanism to disengage the same, means for shifting said stop into and out of its operative position, a brake coöperating with that part of the clutch mechanism with which said stop device coöperates, a presser foot, and means connected with said swinging stop for automatically operating said presser foot.

10. In a sewing machine, the combination of a driving shaft, means for transmitting power thereto and including means for stopping and starting said shaft and comprising clutch mechanism connected with said shaft, a swinging stop coöperating with a part of said clutch mechanism to disengage the same, means for shifting said stop into and out of its operative position, a brake coöperating with that part of the clutch mechanism with which said stop device coöperates, a presser foot, means connected with said swinging stop for automatically operating said presser foot, and independent means for operating said presser foot.

11. In a sewing machine, the combination of a driving shaft, means for transmitting power thereto and including means for stopping and starting said shaft and comprising clutch mechanism consisting of a constantly rotating clutch member and an intermittently driven clutch member connected with said shaft and having a stop tooth, a swinging stop finger adapted to coöperate with said tooth and effect an immediate stoppage of the latter clutch member, a lever supporting said finger, and means for shifting said lever.

12. In a sewing machine, the combination of a driving shaft, means for transmitting power thereto and including means for stopping and starting said shaft and comprising clutch mechanism consisting of a constantly rotating clutch member and an intermittently driven clutch member connected with said shaft and having a stop tooth, a swinging stop finger adapted to coöperate with said tooth and effect an immediate stoppage of the latter clutch member, a lever supporting said finger, means for shifting said lever, and a buffer for said stop finger.

13. In a sewing machine, the combination of a driving shaft, means for transmitting power thereto and including means for stopping and starting said shaft and comprising clutch mechanism consisting of a constantly rotating clutch member and an intermittently driven clutch member connected with said shaft and having a stop tooth, a swinging stop finger adapted to coöperate with said tooth, a lever supporting said finger, means for shifting said lever, and a buffer carried by said lever for said stop finger.

14. In a sewing machine, the combination of a driving shaft, means for transmitting power thereto and including means for stopping and starting said shaft and comprising clutch mechanism consisting of a constantly rotating clutch member and an intermittently driven clutch member connected with said shaft and having a stop tooth, a swinging stop finger adapted to coöperate with said tooth and effect an immediate stoppage of the latter clutch member, a lever supporting said finger, means for shifting said lever, and a brake for that clutch member with which said stop finger coöperates.

15. In a sewing machine, the combination of a driving shaft, means for transmitting power thereto and including means for stopping and starting said shaft and comprising clutch mechanism consisting of a constantly rotating clutch member and an intermittently driven clutch member connected with said shaft and having a stop tooth, a swinging stop finger adapted to coöperate with said tooth and effect an immediate stoppage of the latter clutch member, a lever supporting said finger, means for shifting said lever, a brake for that clutch member with which said stop finger coöperates, and means operated by said lever for shifting said brake.

16. In a sewing machine, the combination of a driving shaft, means for transmitting power thereto and including means for stopping and starting said shaft and comprising clutch mechanism consisting of a constantly rotating clutch member and an intermittently driven clutch member connected with said shaft and having a stop tooth, a swinging stop finger adapted to coöperate with said tooth, a lever supporting said finger, means for shifting said lever, a buffer carried by said lever for said stop finger, a brake for that clutch member with which said stop finger coöperates, and means operated by said lever for shifting said brake.

17. In a sewing machine, the combination of a driving shaft, means for transmitting power thereto and including means for stopping and starting said shaft and comprising clutch mechanism consisting of a constantly rotating clutch member and an intermittently driven clutch member connected with said shaft and having a stop tooth, a swinging stop finger adapted to coöperate with said tooth, a lever supporting said finger, means for shifting said lever, a buffer carried by said lever for said stop finger, a brake for that clutch member with which said stop finger coöperates, means operated by said lever for shifting said brake, a presser foot, and means for automatically operating it.

18. In a sewing machine, the combination of a driving shaft, means for transmitting power thereto and including means for stopping and starting said shaft and comprising clutch mechanism consisting of a constantly rotating clutch member and an intermittently driven clutch member connected with said shaft and having a stop tooth, a swinging stop finger adapted to coöperate with said tooth, a lever supporting said finger, means for shifting said lever, a buffer carried by said lever for said stop finger, a brake for that clutch member with which said stop finger coöperates, means operated by said lever for shifting said brake, a presser foot, means for automatically operating it, and means for independently operating said presser foot.

19. In a sewing machine, the combination of a driving shaft, means for transmitting power thereto and including means for stopping and starting said shaft and comprising clutch mechanism consisting of a constantly rotating clutch member and an intermittently driven clutch member connected with said shaft and having a stop tooth, a swinging stop finger adapted to coöperate with said tooth, a lever supporting said finger, means for shifting said lever, a buffer carried by said lever for said stop finger, a brake for that clutch member with which said stop finger coöperates, means operated by said lever for shifting said brake, a presser foot, and means connected with said stop finger for automatically operating said presser foot.

20. In a sewing machine, the combination of a driving shaft, means for transmitting power thereto and including means for stopping and starting said shaft and comprising clutch mechanism consisting of a constantly rotating clutch member and an intermittently driven clutch member connected with said shaft and having a stop tooth, a swinging stop finger adapted to coöperate with said tooth, a lever supporting said finger, means for shifting said lever, a buffer carried by said lever for said stop finger, a brake for that clutch member with which said stop finger coöperates, means operated by said lever for shifting said brake, a presser foot, means connected with said stop finger for automatically operating said presser foot, and independent means for actuating said presser foot.

21. In a sewing machine, the combination of a driving shaft, means for transmitting power thereto and including means for stopping and starting said shaft and comprising clutch mechanism consisting of a constantly rotating clutch member and an intermittently driven clutch member connected with said shaft and having a stop tooth, a swinging stop finger adapted to coöperate with said tooth, a lever supporting said finger, means for shifting said lever, and automatically operative means for holding said stop finger away from said stop tooth.

22. In a sewing machine, the combination of a driving shaft, means for transmitting power thereto and including means for stopping and starting said shaft and comprising clutch mechanism consisting of a constantly rotating clutch member and an intermittently driven clutch member connected with said shaft and having a stop tooth, a swinging stop finger adapted to coöperate with said tooth, a lever supporting said finger, means for shifting said lever, and a swinging latch for holding said stop finger away from said stop tooth.

23. In a sewing machine, the combination of a driving shaft, means for transmitting power thereto and including means for stopping and starting said shaft and comprising clutch mechanism consisting of a constantly rotating clutch member and an intermittently driven clutch member spring connected with said shaft and having a stop tooth, a swinging stop finger adapted to coöperate with said tooth, a lever supporting said finger, and means for shifting said lever.

24. In a sewing machine, the combination of a driving shaft, means for transmitting power thereto and including means for stopping and starting said shaft and comprising clutch mechanism consisting of a constantly rotating clutch member and an intermittently driven clutch member spring connected with said shaft and having a stop tooth, a swinging stop finger adapted to coöperate with said tooth, a lever supporting said finger, means for shifting said lever, a buffer carried by said lever for said stop finger, a brake for that clutch member with which said stop finger coöperates, means operated by said lever for shifting said brake, a presser foot, and means for automatically operating it.

25. In a sewing machine, the combination of a driving shaft, means for transmitting power thereto and including means for stopping and starting said shaft and comprising clutch mechanism consisting of a constantly rotating clutch member and an intermittently driven clutch member connected with said shaft and having a stop tooth, a swinging stop finger adapted to coöperate with said tooth, a two-armed lever, one arm thereof supporting said finger, means for shifting said lever, and automatically operative means for holding said lever in one of its shifted positions.

26. In a sewing machine, the combination of a driving shaft, means for transmitting power thereto and including means for stopping and starting said shaft and comprising clutch mechanism consisting of a constantly rotating clutch member and an intermittently driven clutch member connected with said shaft and having a stop tooth, a swinging stop finger adapted to coöperate with said tooth, a two-armed lever, one arm thereof supporting said finger, means for shifting said lever, and a buffer carried by said arm for said stop finger.

27. In a sewing machine, the combination of a driving shaft, means for transmitting power thereto and including means for stopping and starting said shaft and comprising clutch mechanism consisting of a constantly rotating clutch member and an intermittently driven clutch member connected with said shaft and having a stop tooth, a swinging stop finger adapted to coöperate with said tooth, a two-armed lever, one arm thereof supporting said finger, means for shifting said lever, a buffer carried by said arm for said stop finger, a brake for the intermittently operated clutch member, and means connected with the other arm of said lever for actuating said brake.

28. In a sewing machine, the combination of a driving shaft, means for transmitting power thereto and including means for stopping and starting said shaft and comprising clutch mechanism consisting of a constantly rotating clutch member and an intermittently driven clutch member connected with said shaft and having a stop tooth, a swinging stop finger adapted to coöperate with said tooth, a two-armed lever, one arm thereof supporting said finger, means for shifting said lever, a buffer carried by said arm for said stop finger, a brake for the intermittently operated clutch member, means connected with the other arm of said lever for actuating said brake, and means for holding said brake shoe and stop finger out of engagement with its clutch member.

29. In a sewing machine, the combination of a driving shaft, means for transmitting power thereto and including means for stopping and starting said shaft and comprising clutch mechanism consisting of a constantly rotating clutch member and an intermittently driven clutch member connected with said shaft and having a stop tooth, a swinging stop finger adapted to coöperate with said tooth, a two-armed lever, one arm thereof supporting said finger, means for shifting said lever, a buffer carried by said arm for said stop finger, a brake for the intermittently operated clutch member, means connected with the other arm of said lever for actuating said brake, and means for holding said brake and stop finger out of engagement with its clutch member and comprising a gravity operated latch.

30. In a sewing machine, the combination of a driving shaft, means for transmitting power thereto and including means for stopping and starting said shaft and comprising clutch mechanism consisting of a constantly rotating clutch member and an intermittently driven clutch member connected with said shaft and having a stop tooth, a swinging stop finger adapted to coöperate with said tooth, a two-armed lever, one arm thereof supporting said finger, means for shifting said lever, a buffer carried by said arm for said stop finger, a brake for the intermittently operated clutch member, means connected with the other arm of said lever for actuating said brake, and means coöperating with said lever shifting means for holding said brake and stop finger out of engagement with its clutch member.

31. In a sewing machine, the combination of a driving shaft, means for transmitting power thereto and including means for stopping and starting said shaft and comprising clutch mechanism consisting of a constantly rotating clutch member and an intermittently driven clutch member connected with said shaft and having a stop tooth, a swinging stop finger adapted to coöperate with said tooth, a two-armed lever, one arm thereof supporting said finger, means for shifting said lever, a buffer carried by said arm for said stop finger, a brake for the intermittently operated clutch member, means connected with the other arm of said lever for actuating said brake, and means coöperating with said lever shifting means for holding said brake and stop finger out of engagement with its clutch member and comprising a swinging latch.

32. In a sewing machine, the combination of a driving shaft, means for transmitting power thereto and including means for stopping and starting said shaft and comprising clutch mechanism consisting of a constantly rotating clutch member and an intermittently driven clutch member connected with said shaft and having a stop tooth, a swinging stop finger adapted to coöperate with said tooth, a two-armed lever, one arm thereof supporting said finger, means for shifting said lever, a buffer carried by said arm for said stop finger, a brake for the intermittently operated clutch member, means connected with the other arm of said lever for actuating said brake, means coöperating with said lever shifting means for holding said brake and stop finger out of engagement with its clutch member, a presser foot, and means connected with said stop finger for automatically lifting said presser foot.

33. In a sewing machine, the combination of a driving shaft, means for transmitting power thereto and including means for stopping and starting said shaft and comprising clutch mechanism, means for disengaging the members of said clutch mechanism, a presser foot, and means connecting said presser foot with said disengaging means whereby the blow of said disengaging means in separating the clutch members will automatically raise the presser foot.

34. In a sewing machine, the combination of a driving shaft, means for transmitting power thereto and including means for stopping and starting said shaft and comprising clutch mechanism, means for disengaging the members of said clutch mechanism, a presser foot, means connecting said presser foot with said disengaging means whereby the blow of said disengaging means in separating the clutch members will automatically raise the presser foot, and independent means for actuating said presser foot.

35. In a sewing machine, the combination of a driving shaft, means for transmitting power thereto and including means for stopping and starting said shaft and comprising clutch mechanism, means for disengaging the members of said clutch mechanism and comprising a lever and a releasing device shiftably carried thereby.

36. In a sewing machine, the combination of a driving shaft, means for transmitting power thereto and including means for stopping and starting said shaft and comprising clutch mechanism, means for disengaging the members of said clutch mechanism and comprising a lever and a releasing device shiftably carried thereby, a brake for said clutch mechanism, and means also carried by said lever for actuating said brake.

37. In a sewing machine, the combination of a driving shaft, means for transmitting power thereto and including means for stopping and starting said shaft and comprising clutch mechanism, means for disengaging the members of said clutch mechanism and comprising a lever and a releasing device shiftably carried thereby, a presser foot, and means connecting said presser foot with said releasing device whereby movement thereof in one direction will automatically raise said presser foot.

38. In a sewing machine, the combination of a driving shaft, means for transmitting power thereto and including means for stopping and starting said shaft and comprising clutch mechanism, means for disengaging the members of said clutch mechanism and comprising a two-armed lever, a clutch disengaging means carried by one arm thereof, a brake, means carried by the other arm of said lever for actuating said brake, a presser foot, and means connecting said presser foot with said disengaging means whereby the blow of said disengaging means in separating the clutch members will automatically raise the presser foot.

39. In a sewing machine, the combination of a driving shaft, means for transmitting power thereto and including means for stopping and starting said shaft and comprising clutch mechanism consisting of a constantly rotating clutch member and an intermittently driven clutch member having a stop tooth, a swinging stop finger adapted to coöperate with said tooth, means for shifting said finger, a spring pressed presser foot, and means connecting said presser foot with said stop finger whereby the blow of said stop finger in disengaging the clutch members will automatically raise said presser foot.

40. In a sewing machine, the combination of a top driving shaft, stitching mechanism, feeding mechanism and looper mechanism all driven from said shaft, power transmitting mechanism, clutch mechanism carried by said shaft, and means connected with said power transmitting mechanism for operating said clutch mechanism thereby to throw said shaft into and out of operation and control the speed thereof and including a shiftable stop finger.

41. In a sewing machine, the combination of a top driving shaft, stitching mechanism, feeding mechanism and looper mechanism all driven from said shaft, power transmitting mechanism, clutch mechanism carried by said shaft, means connected with said power transmitting mechanism for operating said clutch mechanism thereby to throw said shaft into and out of operation and control the speed thereof and including a shiftable stop finger, and a brake for said clutch mechanism and also controlled by said means.

42. In a sewing machine, the combination of a top driving shaft, stitching mechanism, feeding mechanism and looper mechanism all driven from said shaft, power transmitting mechanism, clutch mechanism carried by said shaft, means connected with said power transmitting mechanism for operating said clutch mechanism thereby to throw said shaft into and out of operation and control the speed thereof and including a shiftable stop finger, a brake for said clutch mechanism and also controlled by said means, a presser foot mechanism, and means for simultaneously and automatically releasing the presser foot on the stoppage of said shaft.

43. In a sewing machine, the combination of a top driving shaft, stitching mechanism, feeding mechanism and looper mechanism all driven from said shaft, power transmitting mechanism, clutch mechanism carried by said shaft, means connected with said power transmitting mechanism for operating said clutch mechanism thereby to throw said shaft into and out of operation and control the speed thereof and including a shiftable stop finger, a brake for said clutch mechanism and also controlled by said means, a presser foot mechanism, means for simultaneously and automatically releasing the presser foot on the stoppage of said shaft, and means for independently operating the presser foot.

44. In a sewing machine, the combination of a top driving shaft, stitching mechanism, feeding mechanism and looper mechanism all driven from said shaft, power transmitting mechanism, clutch mechanism carried by said shaft, means connected with said power transmitting mechanism for operating said clutch mechanism thereby to throw said shaft into and out of operation and control the speed thereof and including a shiftable stop finger, and automatic lubricating means for said shaft driven mechanisms, said driving shaft forming a conduit therefor.

45. In a sewing machine, the combination of a top driving shaft, stitching mechanism, feeding mechanism and looper mechanism all driven from said shaft, power transmitting mechanism, clutch mechanism carried by said shaft, means connected with said power transmitting mechanism for operating said clutch mechanism thereby to throw said shaft into and out of operation and control the speed thereof and including a shiftable stop finger, a presser foot mechanism, means for automatically and simultaneously releasing the presser foot on the stoppage of said shaft, and automatic lubricating means for said shaft driven mechanisms, said driving shaft forming a conduit therefor.

46. In a sewing machine, the combination of a driving shaft, treadle operated power transmitting mechanism therefor, clutch mechanism connected with said shaft and comprising a constantly driven clutch wheel loosely mounted upon said shaft, a coöperating intermittently operated clutch member spring connected with said shaft and having a stop tooth, a swinging stop finger adapted to coöperate with said tooth, a two-armed lever to one arm of which said stop finger is pivotally connected for shiftable movement into and out of engagement with said stop tooth, a buffer carried by said two-armed lever for said finger, a brake shoe adapted to engage the intermittently operated clutch member, a lever for operating said shoe, means carried by said two-armed lever for controlling the operation of said brake shoe lever, means connected with said power transmitting mechanism for shifting said two-armed lever, a gravity latch for holding said two-armed lever in a certain position, means carried by said connecting means for releasing said latch, a presser foot, means connecting said presser foot with said swinging stop finger whereby the blow of said finger in disengaging the clutch members will raise the presser foot, and means for raising said presser foot independently of the automatic raising thereof.

47. In a sewing machine, the combination of stitching mechanism, feeding mechanism and looper mechanism, a driving shaft therefor, treadle operated power transmitting mechanism therefor, clutch mechanism connected with said shaft and comprising a constantly driven clutch wheel loosely mounted upon said shaft, a coöperating intermittently operated clutch member spring connected with said shaft and having a stop tooth, a swinging stop finger adapted to coöperate with said tooth, a two-armed lever to one arm of which said stop finger is pivotally connected for shiftable movement into and out of engagement with said stop tooth, a buffer carried by said two-armed lever for said finger, a brake shoe adapted to engage the intermittently operated clutch member, a lever for operating said shoe, means carried by said two-armed lever for controlling the operation of said brake shoe lever, means connected with said power transmitting mechanism for shifting said two-armed lever, a gravity latch for holding said two-armed lever in a certain position, means carried by said connecting means for releasing said latch, a presser foot, means connecting said presser foot with said swinging stop finger whereby the blow of said finger in disengaging the clutch members will raise the presser foot, means for raising said presser foot independently of the automatic raising thereof, and automatic lubricating means for said mechanisms, said driving shaft forming a conduit therefor.

48. In a sewing machine, the combination of a driving shaft, a treadle-operated transmitter, means connecting said transmitter with said driving shaft and including means for stopping and starting said shaft and comprising clutch mechanism, means for disengaging the members of the clutch mechanism, and means for holding the disengaging means in its disengaged position, the organization being such that the treadle-operated transmitter may be operated to increase or decrease the speed of the machine without interfering with said holding means.

49. In a sewing machine having an overhanging arm, a presser foot, means for supporting said presser foot and extending under said arm and pivotally connected at the lower rear end thereof, and means for raising and lowering said presser foot.

50. A sewing machine having an overhanging arm, a presser foot, means for supporting said presser foot and extending under said arm and having connection with the rear lower end thereof, and means for automatically raising said presser foot.

51. A sewing machine having an overhanging arm, a presser foot, means for supporting said presser foot and extending under said arm and having connection with the rear lower end thereof, means for automatically raising said presser foot, and means for independently raising said presser foot.

52. A sewing machine having an overhanging arm, a presser foot, means for supporting said presser foot and extending lengthwise of said arm and connected thereto at the rear thereof, a driving shaft, means for stopping and starting said driving shaft and controlling the speed thereof and including clutch mechanism connected with the driving shaft, power transmitting mechanism for said driving shaft, means connected with said power transmitting mechanism and the clutch mechanism for controlling the operation of the latter, and means connected with said last means and with said presser foot supporting means for automatically operating said presser foot.

53. A sewing machine having an overhanging arm, a presser foot, supporting means therefor and substantially conforming to the underside of said arm and pivotally connected to said arm, and means for raising and lowering said presser foot.

54. A sewing machine having an overhanging arm, a presser foot, supporting means therefor substantially conforming to the underside of said arm and pivotally secured adjacent to the lower rear end thereof, and means for actuating said presser foot.

55. A sewing machine having an overhanging arm, a presser foot, supporting means therefor substantially conforming to the underside of said arm and pivotally secured adjacent to the lower rear end thereof, means for actuating said presser foot, a driving shaft, clutch mechanism connected therewith, power transmitting mechanism, means connecting said power transmitting mechanism with said clutch mechanism and including means for actuating said clutch mechanism, and means coöperating with said connecting means and with said presser foot supporting means whereby on the operation of the clutch mechanism at one period the presser foot will be automatically raised.

56. A sewing machine having a tubular horn, and stitching mechanism and thread controlling means located at the free end of the horn and including thread tension and thread take-up mechanism.

57. In a sewing machine, the combination of a driving shaft, a treadle-operated transmitter, means connecting said transmitter with said driving shaft and including means for stopping and starting said shaft and comprising clutch mechanism, means for disengaging the members of the clutch mechanism, and an automatically operative latch for holding the disengaging means in its disengaged position, the organization being such that the treadle-operated transmitter may be operated to increase or decrease the speed of the machine without interfering with said holding means.

58. In a sewing machine having an overhanging arm and a tubular work carrying horn, a presser foot, means connecting said presser foot, with the rear lower end of said overhanging arm, duplicate means for raising said presser foot, and means for automatically operating one of said means.

59. In a sewing machine having an overhanging arm, needle mechanism, a driving shaft for operating said needle mechanism, thread carrying means in juxtaposition to said needle mechanism and comprising a pair of thread carrying fingers, gears connected with said fingers, and means connected with the driving shaft for oscillating said thread carrying fingers.

60. In a sewing machine, the combination of a driving shaft, treadle operated power transmitting mechanism therefor, clutch mechanism connected with said shaft and comprising a constantly driven clutch wheel loosely mounted upon said shaft, a coöperating intermittently operated clutch member spring connected with said shaft and having a stop tooth, a swinging stop finger adapted to coöperate with said tooth, a two-armed lever to one arm of which said stop finger is pivotally connected for shiftable movement into and out of engagement with said stop finger, a buffer carried by said two-armed lever for said finger, a brake shoe adapted to engage the intermittently operated clutch member, a lever for operating said shoe, means carried by said two-armed lever for controlling the operation of said brake shoe lever, a rod connected with said power transmitting mechanism, a sliding sleeve on said rod, means connecting said sleeve with said two-armed lever, said sleeve having a slot, a pin carried by said rod and projecting through said slot, a gravity latch adapted to coöperate with said pin to hold said two-armed lever in a certain position, and means carried by said rod for releasing said latch.

61. In a sewing machine, the combination of a driving shaft, treadle operated power transmitting mechanism therefor, clutch mechanism connected with said shaft and comprising a constantly driven clutch wheel loosely mounted upon said shaft, a coöperating intermittently operated clutch member spring connected with said shaft and having a stop tooth, a swinging stop finger adapted to coöperate with said tooth, a two-armed lever to one arm of which said stop finger is pivotally connected for shiftable movement into and out of engagement with said stop finger, a buffer carried by said two-armed lever for said finger, a brake shoe adapted to engage the intermittently operated clutch member, a lever for operating said shoe, means carried by said two-armed lever for controlling the operation of said brake shoe lever, a rod connected with said power transmitting mechanism, a sliding sleeve on said rod, means connecting said sleeve with said two-armed lever, said sleeve having a slot, a pin carried by said rod and projecting through said slot, a gravity latch adapted to coöperate with said pin to hold said two-armed lever in a certain position, means carried by said rod for releasing said latch, a presser foot, a supporting arm therefor, means connecting said supporting arm with said swinging stop finger and comprising a link adapted to engage said buffer, a connecting rod, a lever connecting said link and rod, a member connected to said rod, and a lever connected to said presser foot supporting arm and adapted to coöperate with said member.

62. In a sewing machine, the combination of a driving shaft, treadle operated power transmitting mechanism therefor, clutch mechanism connected with said shaft and comprising a constantly driven clutch wheel loosely mounted upon said shaft, a coöperating intermittently operated clutch member spring connected with said shaft and having a stop tooth, a swinging stop finger adapted to coöperate with said tooth, a two-armed lever to one arm of which said stop finger is pivotally connected for shiftable movement into and out of engagement with said stop finger, a buffer carried by said two-armed lever for said finger, a brake shoe adapted to engage the intermittently operated clutch member, a lever for operating said shoe, means carried by said two-armed lever for controlling the operation of said brake shoe lever, a rod connected with said power transmitting mechanism, a sliding sleeve on said rod, means connecting said sleeve with said two-armed lever, said sleeve having a slot, a pin carried by said rod and projecting through said slot, a gravity latch adapted to coöperate with said pin to hold said two-armed lever in a certain position, means carried by said rod for releasing said latch, a presser foot, a supporting arm therefor, means connecting said supporting arm with said swinging stop finger and comprising a link adapted to engage said buffer, a connecting rod, a lever connecting said link and rod, a member connected to said rod, a lever connected to said presser foot supporting arm and adapted to coöperate with said member, and treadle operating means connected with said presser foot arm lever.

63. In a sewing machine, the combination of a driving shaft, means for transmitting power thereto and including means for stopping and starting said shaft and comprising clutch mechanism consisting of a constantly rotating clutch member and an intermittently driven clutch member connected with said shaft and having a stop tooth, a swinging stop finger adapted to coöperate with said tooth, a lever supporting said finger, means for shifting said lever, a presser foot, a supporting arm therefor, means connecting said supporting arm with said swinging stop finger and comprising a link, a connecting rod, a lever connecting said link and rod, a member connected to said rod, and a lever connected to said presser foot supporting arm and adapted to coöperate with said member.

64. In a sewing machine, the combination of a driving shaft, means for transmitting power thereto and including means for stopping and starting said shaft and comprising clutch mechanism consisting of a constantly rotating clutch member and an intermittently driven clutch member connected with said shaft and having a stop tooth, a swinging stop finger adapted to coöperate with said tooth, a lever supporting said finger, means for shifting said lever, a presser foot, a supporting arm therefor, means connecting said supporting arm with said swinging stop finger and comprising a link, a connecting rod, a lever connecting said link and rod, a member connected to said rod, a lever connected to said presser foot supporting arm and adapted to coöperate with said member, and treadle operating means connected with said presser foot arm lever.

65. In a sewing machine, the combination of a driving shaft, means for transmitting power thereto and including means for stopping and starting said shaft and comprising clutch mechanism consisting of a constantly rotating clutch member and an intermittently driven clutch member connected with said shaft and having a stop tooth, a swinging stop finger adapted to coöperate with said tooth, a lever supporting said finger, means for shifting said lever, a buffer carried by said lever for said stop finger, and lubricating means also carried by said lever for said buffer.

66. In a sewing machine, the combination of a driving shaft, means for transmitting power thereto at different speeds and including means for starting and stopping said shaft, a presser foot, and means connecting said presser foot with said starting and stopping mechanism whereby the presser foot will be automatically lifted through the medium of said starting and stopping mechanism only on the stopping of the machine.

67. In a sewing machine, the combination of a driving shaft, means for transmitting power thereto at different speeds and including means for starting and stopping said shaft, a presser foot, and means connecting said presser foot with said starting and stopping mechanism whereby only on the stopping of the driving shaft will the presser foot be automatically raised.

68. In a sewing machine, the combination of a driving shaft, means for transmitting power thereto and including means for starting and stopping said shaft, a presser foot, means connecting said presser foot with said starting and stopping mechanism whereby the presser foot will be automatically lifted through the medium of said starting and stopping mechanism only on the stopping of the machine, and independent means for manually controlling the raising of said presser foot.

69. In a sewing machine, the combination of a driving shaft, means for transmitting power thereto and including means for starting and stopping said shaft, a presser foot, means connecting said presser foot with said starting and stopping mechanism whereby only on the stopping of the driving shaft will the presser foot be automatically raised, and independent means for manually controlling the raising of said presser foot.

70. In a sewing machine, the combination of a driving shaft, a treadle controlled transmitter, means connecting the transmitter with said driving shaft and including means for stopping and starting said shaft and comprising clutch mechanism, means for disengaging the members of said clutch mechanism, a presser foot, and means connecting said presser foot with said disengaging means whereby the presser foot will be automatically operated at predetermined times.

71. In a sewing machine, the combination of a driving shaft, a treadle operated transmitter, means connecting said transmitter with said driving shaft and including means for stopping and starting said shaft and comprising clutch mechanism, a swinging releasing device for disengaging the members of said clutch mechanism, and automatically operative means for holding said releasing device in its disengaging position.

72. In a sewing machine, the combination of a driving shaft, a treadle operated transmitter, means connecting said transmitter with said driving shaft and including means for stopping and starting said shaft and comprising clutch mechanism, a swinging releasing device for disengaging the members of said clutch mechanism, a presser foot, and means connecting said presser foot with said disengaging means whereby the presser foot is automatically operated on the movement of said disengaging means.

73. In a sewing machine, the combination of a driving shaft, a treadle operated transmitter, means connecting said transmitter with said driving shaft and including means for stopping and starting said shaft and comprising clutch mechanism, a swinging releasing device for disengaging the members of said clutch mechanism, a presser foot, means connecting said presser foot with said disengaging means whereby the presser foot is automatically operated on the movement of said disengaging means, and means for absorbing the shock of said disengaging means.

74. In a sewing machine, the combination of a driving shaft, means for transmitting power thereto to rotate the same at different speeds and including means for starting and stopping said shaft and comprising means for stopping said shaft while rotating at any speed without the necessity of reducing it to a minimum speed.

75. In a sewing machine, the combination of a driving shaft, means for transmitting power thereto to rotate the same at different speeds and including means for starting and stopping said shaft and comprising means for stopping said shaft while rotating at any speed without the necessity of reducing it to a minimum speed and including means for absorbing the shock of the mechanism on the stoppage of the shaft.

76. In a sewing machine, the combination of a driving shaft, means for transmitting power thereto to rotate the same at different speeds and including means for starting and stopping said shaft and comprising means for stopping said shaft while rotating at any speed without the necessity of reducing it to a minimum speed, and presser foot mechanism connected with said starting and stopping mechanism whereby on the operation thereof the presser foot will be automatically operated.

77. In a sewing machine, the combination of a driving shaft, a transmitter, means for imparting motion from the transmitter to the driving shaft and including means for stopping and starting said shaft and comprising clutch mechanism, means for disengaging the members of said clutch mechanism, and a rod connected with said clutch disengaging means and the transmitter and having a member, said member and rod being movable one relatively to the other, and automatically operative means for holding said disengaging means in its disengaging position and coöperating with said rod member.

78. In a sewing machine, the combination of a driving shaft, a transmitter, means for imparting motion from the transmitter to the driving shaft and including means for stopping and starting said shaft and comprising clutch mechanism, means for disengaging the members of said clutch mechanism, and a rod connected with said clutch disengaging means and the transmitter and having a member, said member and rod being movable one relatively to the other, and automatically operative means for holding said disengaging means in its disengaging position and coöperating with said rod member, the organization being such that the transmitter may be operated to increase or decrease the speed of the driving shaft without interfering with said automatically operative holding means.

79. In a sewing machine, the combination of a driving shaft, a transmitter, means connecting the transmitter with said driving shaft and including means for stopping and starting said shaft and comprising clutch mechanism, means for holding the clutch mechanism in its disengaged position, means connecting it with the transmitter, and automatically operative means for holding said holding means in its disengaged position.

80. In a sewing machine, the combination of a driving shaft, a transmitter, means connecting said transmitter with said driving shaft and including means for stopping and starting said shaft and comprising clutch mechanism, means for disengaging the members of said clutch mechanism, a rod connecting said disengaging means with the transmitter, a stop carrying member, said member and rod having movement one relatively to the other, and an automatically operative latch for engaging said stop member thereby to hold the clutch disengaging means in its disengaging position, the organization being such that the transmitter may be operated to increase or decrease the speed of the driving shaft until the rod is shifted to substantially its full extent.

81. A sewing machine having a hollow horn and stitching mechanism, and thread-controlling means located at the free end of the horn and including thread-tension means.

82. A sewing machine having a hollow horn, stitching mechanism located at the free end of said horn and including a looper, a looper thread guiding tube secured to the horn along the same and having a slot and forming means for conducting the looper thread from the source of supply to the looper.

83. A sewing machine having a hollow horn, stitching mechanism located at the free end of said horn and including a looper, a looper thread guiding tube secured to the horn along the same and having a slot and forming means for conducting the looper thread from the source of supply to the looper, and thread tension means secured to the horn and projecting into the guide tube.

84. A sewing machine having a hollow horn, stitching mechanism located at the free end of said horn and including a looper, a looper thread guiding tube secured to the horn along the same and having a slot and forming means for conducting the looper thread from the source of supply to the looper, said guide tube having slots, and thread tension means secured to the horn adjacent to the free end thereof and provided with a plurality of fingers extending into the slots of the tube.

85. A sewing machine having a hollow horn, stitching mechanism located at the free end of said horn and including a looper, a looper thread guiding tube secured to the horn along the same and having a slot and forming means for conducting the looper thread from the source of supply to the looper, said guide tube having slots, thread tension means secured to the horn adjacent to the free end thereof and provided with a plurality of fingers extending into the slots of the tube, and a thread take-up arm located at the free end of the horn.

Signed at Nyack, in the county of Rockland and State of New York, this 29th day of November, 1915.

JOHN P. WEIS.